(12) United States Patent
Massignani (10) Patent No.: US 9,808,747 B2
(45) Date of Patent: Nov. 7, 2017

(54) MACHINE FOR CONTINUOUS MICROFILTRATION OF PROCESS AND WASTE WATER, FOR REUSE THEREOF IN AGRICULTURE AND INDUSTRY

(71) Applicant: NUOVE ENERGIE S.R.L., Vicenza (IT)

(72) Inventor: Donato Massignani, Vicenza (IT)

( * ) Notice: Subject to any disclaimer, the term of this patent is extended or adjusted under 35 U.S.C. 154(b) by 17 days.

(21) Appl. No.: 14/415,578

(22) PCT Filed: Jul. 30, 2013

(86) PCT No.: PCT/IB2013/056259
§ 371 (c)(1),
(2) Date: Jan. 17, 2015

(87) PCT Pub. No.: WO2014/020540
PCT Pub. Date: Feb. 6, 2014

(65) Prior Publication Data
US 2015/0224429 A1    Aug. 13, 2015

(30) Foreign Application Priority Data
Jul. 30, 2012    (IT) ................ VI2012A0190

(51) Int. Cl.
*B01D 33/15*    (2006.01)
*B01D 33/46*    (2006.01)
(Continued)

(52) U.S. Cl.
CPC ............. *B01D 33/15* (2013.01); *B01D 33/23* (2013.01); *B01D 33/463* (2013.01);
(Continued)

(58) Field of Classification Search
CPC ...... B01D 33/15; B01D 33/76; B01D 33/463; B01D 33/466; B01D 33/073; B01D 33/21;
(Continued)

(56) References Cited

U.S. PATENT DOCUMENTS 3,471,026 A * 10/1969 Riker ................ B01D 33/23
210/327
4,999,104 A * 3/1991 Krieger ............... B01D 33/15
210/196

(Continued)

FOREIGN PATENT DOCUMENTS

AU    199061020 A * 2/1991 ............ B01D 29/03
CN    102008848 A * 4/2011 ............ B01D 29/03
(Continued)

*Primary Examiner* — Krishnan S Menon
*Assistant Examiner* — Waqaas Ali
(74) *Attorney, Agent, or Firm* — Themis Law (57) ABSTRACT

A continuous microfiltration machine for removing suspended solid particles from process and waste water comprises a container (2) with an inlet conduit (4) defining a flow direction (F), and having therein an influent chamber (7) for feeding the liquid to be filtered, a treatment chamber (8) with a bottom wall (9), at least one pair of filter disks (10) keyed to a shaft (12) perpendicular to the flow direction (F) and having inner filter surfaces (10') outer surfaces (10") and outer peripheral edges (15) in sliding contact with the bottom wall (9), an effluent chamber (17) for receiving the filtered liquid, with a discharge conduit (18), drive means (13, 14) for imparting rotation to the disks, first jet washing means (20) directed against the outer surfaces (10"') of the disks (10) for removing the particles retained thereby, a first collecting duct (24) for collecting the removed particles, which is interposed between the disks (10) and has substantially parallel side edges (25) located at a predetermined minimum distance (D) from the inner surfaces (10') of the
(Continued)

disks (10). The inner surfaces (10') of the disks are substantially flat and continuous surfaces, with a flatness error ($\epsilon$) smaller than said predetermined minimum distance (D).

17 Claims, 10 Drawing Sheets

(51) Int. Cl.
| | | |
|---|---|---|
| *B01D 33/23* | (2006.01) | |
| *B01D 33/76* | (2006.01) | |
| *B01D 33/073* | (2006.01) | |
| *B01D 33/03* | (2006.01) | |
| B01D 33/50 | (2006.01) | |
| B01D 33/21 | (2006.01) | |
| B01D 33/37 | (2006.01) | |

(52) U.S. Cl.
CPC ........ *B01D 33/466* (2013.01); *B01D 33/76* (2013.01); *B01D 33/0315* (2013.01); *B01D 33/073* (2013.01); *B01D 33/21* (2013.01); *B01D 33/37* (2013.01); *B01D 33/50* (2013.01)

(58) Field of Classification Search
CPC ........ B01D 33/50; B01D 33/23; B01D 33/37; B01D 33/0315
See application file for complete search history.

(56) References Cited

U.S. PATENT DOCUMENTS

| | | | | | |
|---|---|---|---|---|---|
| 5,084,174 | A | * | 1/1992 | Perala | B01D 29/111 |
| | | | | | 210/331 |
| 5,124,029 | A | * | 6/1992 | Fjallstrom | B01D 33/15 |
| | | | | | 209/250 |
| 5,360,541 | A | * | 11/1994 | Gerakios | B01D 35/303 |
| | | | | | 210/232 |
| 5,876,612 | A | * | 3/1999 | Astrom | B01D 29/41 |
| | | | | | 210/106 |
| 2002/0166821 | A1 | * | 11/2002 | Flanagan | B01D 33/21 |
| | | | | | 210/784 |
| 2005/0139557 | A1 | * | 6/2005 | Ricketts | B01D 29/05 |
| | | | | | 210/791 |
| 2009/0020469 | A1 | * | 1/2009 | Pitre | B01D 33/19 |
| | | | | | 210/232 |
| 2011/0056883 | A1 | * | 3/2011 | Kerl | B01D 29/03 |
| | | | | | 210/483 |

FOREIGN PATENT DOCUMENTS

| | | | | |
|---|---|---|---|---|
| EP | 1129757 A1 | | 9/2001 | |
| FR | 1384810 A | * | 1/1965 | ............ B01D 29/41 |
| GB | 618316 A | * | 2/1949 | ............ B01D 39/12 |
| GB | 708532 A | * | 5/1954 | ............ B01D 33/00 |
| IT | EP 1129757 A1 | * | 9/2001 | ............ B01D 33/15 |

* cited by examiner

MACHINE FOR CONTINUOUS MICROFILTRATION OF PROCESS AND WASTE WATER, FOR REUSE THEREOF IN AGRICULTURE AND INDUSTRY

FIELD OF THE INVENTION

The present invention generally finds application in the field of water treatment and namely relates to a machine for continuous microfiltration of process and waste water, designed for reuse in agricultural and industrial fields.

BACKGROUND ART

As is known, water has become an essential resource for our planet and may be a worldwide strategic asset. The increasing demand of water, especially for agricultural and industrial use has been addressed by novel technologies, which are aimed at reusing and recycling process and waste waters from civil and industrial purification plants.

EP 1 129 757, by the applicant hereof, discloses a machine for microfiltration of suspended solid particles from a liquid stream, having all the features of the preamble of claim 1.

Particularly, the machine as disclosed in the above mentioned patent comprises a box-like enclosure with an inlet conduit for receiving the liquid to be filtered, which defines a flow direction, in which such caisson has therein an influent chamber for containing the liquid to be treated, a treatment chamber located downstream from the influent chamber and having an at least partially cylindrical bottom wall, at least one pair of filter disks, which are keyed to a shaft substantially perpendicular to the flow direction, said disks having inner surfaces adapted to delimit the treatment chamber and peripheral edges in sliding contact with the bottom wall, at least one effluent chamber for receiving the filtered water, located downstream from the treatment chamber and delimited by the pair of filter disks, a discharge conduit for discharging the liquid contained in the effluent chamber and formed in the enclosure. There are provided drive means which act upon the shaft and/or the filter disk to impart a rotation to the pair of disks in a predetermined direction, jet washing means directed against the outer surfaces of the disk for removing the particles retained thereby, means for conveying the solid particles removed by the washing means, comprising at least one first longitudinal duct interposed between the disks and having substantially parallel longitudinal edges placed at a minimum distance from the inner surfaces of the disks, for collecting the solid particles so removed.

This known machine, which is manufactured and sold by the applicant under the trademark ULTRASCREEN®, uses disks with filter meshes operating with the principle of "dynamic tangential filtration", which implies that, as the disks rotate, the direction of the incoming flow is substantially parallel to the filter disks, whereby the particles that move over them have a velocity with a main component parallel to the flow and a second component perpendicular thereto, i.e. with a resultant of the velocity vector inclined to the planes of the meshes.

As a result, the actual flow passage section of the mesh is smaller than the theoretical front section, due to the inclination of the relative velocity of the particles. Therefore, as the rotation speed of the disks increases, the flow passage section of the mesh decreases. This will provide the dynamic effect of blocking the passage of particles having a smaller size than the individual mesh apertures, thereby increasing the effectiveness of the filtration process.

Therefore, as larger particles are blocked, a film is formed, which acts as a precoat that increases filtration efficiency. While this prior art machine perfectly fulfills its intended purpose, it is still susceptible to further improvement. Solid particles deposited on disk meshes are periodically removed by jet washing and backwashing means, directed against the outer surfaces of the disks, to urge them toward a collecting duct interposed between the disks and convey them outside, using appropriate manifolds.

Since each disk has a considerable maximum diameter, typically above 500 mm, its surface, and particularly the surface of the filter mesh of the disks is rather irregular, and the edges of the ducts cannot be maintained at a distance of less than 20-30 mm to prevent interferences with the mesh or damages thereto. Therefore, part of the solid particles retained by the disks pass through the gap between the edges of the duct and the inner surface of the disks and fall into the treatment chamber, which will reduce filtration effectiveness and will not allow the amount of solid particles suspended in filtered water to fall within given values.

Furthermore, since national regulations about reuse of wastewater, such as the California Health and Safety Code of Regulations, Water Code, Titles 22 and 17, are stricter and stricter and require the total solid suspended particle content (SST) to be less than 5 mg/l, the problem arises that these filtration conditions must be improved for allowing recycling of wastewater for agricultural and industrial uses with the maximum possible effectiveness.

A further feature of this prior art machine is a particular massive and heavy structure of the disks, for withstanding considerable hydraulic loads and high flow rates, which increases the inertia of the rotor and hence the power of the run motor, the energy consumption at startup and in steady-state conditions, and transport and maintenance requirements.

Further improvable aspects are the effective efficiency of the filter disk backwashing means, and the lack of protection against splashing of backwashing fluid jets.

DISCLOSURE OF THE INVENTION

The object of the present invention is to obviate the above drawbacks, by providing a machine for microfiltration of suspended solid particles from a liquid stream that is highly efficient and relatively cost-effective.

A particular object is to reduce the total solid particle content to much less than 5 mg/l, thereby meeting the strictest requirements in terms of recycled water, in view of more stringent restrictions imposed by national and local regulatory bodies.

A further particular object is to provide a machine as described above, having a simplified structure, with low maintenance requirements.

These and other objects, as better explained hereinafter, are fulfilled by a machine as described above which, according to the characterizing part of claim 1, has disks with substantially continuous and flat inner surface, with a flatness error smaller than said minimum distance of the edges of the duct from the inner surface of the disks, for increased collection of the removed solid particles and reduced fall thereof into said treatment chamber.

With this particular configuration, the microfiltration efficiency may be increased, and a total solid particle content considerably lower than 5 mg/l will be obtained. Also, the following advantages will be achieved:
- the weight of the filter disks will be about 20% lower than the structures as used in the past;
- the inertial mass of the rotating parts will be about 20% lower, and the disks may have a higher rotation speed, which will increase the filtration flow rate;
- the disk-bearing shaft is subjected to lower stresses;

wear is reduced and the support bearings have a longer life;

the drive system, including the motor, the gear unit and the transmission has a lower power and absorption;

these members have a longer life and fatigue strength;

the machine has a lower energy consumption at start-up and in steady-state conditions;

an overall lower weight of the machine and easier transportation and handling;

a less complex construction of the machine.

Further advantageous embodiments of the invention are defined in accordance with the dependent claims.

BRIEF DESCRIPTION OF THE DRAWINGS

Further feature and advantages of the invention will be more apparent from the detailed description of a preferred, non-exclusive embodiment of a machine for ultrafiltration of suspended solid particles from a liquid stream according to the invention, which is described as a non-limiting example with the help of the annexed drawings, in which.

DETAILED DESCRIPTION OF A FEW PREFERRED EMBODIMENTS

Referring to the above figures, the microfiltration machine of the invention, generally designated by numeral 1, may be used for treatment of wastewater coming from process waters and/or the final section of a civil or industrial purification plant, not shown. The filtration product obtained with the machine may be reused, mainly for agricultural purposes, e.g. for irrigation of crops, or for processes that do not require the use of drinking water, but also for industrial purposes, e.g. for all production processes that do not require the use of drinking water.

The machine 1 basically comprises a base container or caisson 2 having a box-like shape, which is preferably made of sheet metal, and has side walls 2', 2", 2" and a bottom wall 2"', and is open at its top, to define a space V therein which has a vertical center plane M.

In operation, the base container 2 is closed at its top by a lid 3, also made of sheet metal, or of a synthetic material. An inlet conduit 4 for the liquid to be filtered is formed in the lower portion of one of the side walls 2', and its axis defines a flow direction F.

A recirculation conduit 5 may be provided in the side wall 2' of the base container 2, and communicates with an overflow chamber 6 separated from the inner space V of the caisson by a partition wall 6' with an upper weir 6". When the water level in the space V reaches above the weir 6" for any reason, water is channeled toward the recirculation conduit and carried upstream from the inlet conduit 4.

An influent chamber 7 is formed in the caisson 2 for feeding the liquid to be filtered, which chamber 7 is closed at the bottom by the wall 2"', and communicates with the inlet conduit 4.

A filtering or treatment chamber 8 is placed downstream from the influent chamber 7, and has an at least partially cylindrical bottom wall or cradle 9.

At least one pair of substantially identical filter disks 10 are accommodated in the inner space V of the caisson 2, and face each other with respect to the center plane M. Each disk 10 has a central hub 11 rigidly coupled to a shaft 12 at a given minimum distance W, which creates a gap between the disks and also defines the maximum width of the treatment chamber 8. The shaft 12 is rotatably supported on bearings, not shown, which are in turn anchored to the upper edge of the caisson 2 to rotate about its axis of rotation X.

Alternatively, instead of a single pair of disks 10, multiple pair of disks 10 may be provided, which are identical to the first pair and are keyed to the same shaft 12 or to adjacent shafts, having axes parallel to or coincident with the axis X.

The pair of disks 10 is continuously rotated about the axis X by appropriate drive means, e.g. a gearmotor, schematically referenced 13, which is in turn driven by a motor, schematically referenced 14, and kinematically coupled to the disks 10.

Kinematic coupling between the gearmotor 13 and the disks 10 may be provided by any mechanism, e.g. using a joint with the shaft 12 or by direct connection with the disks 10, at their periphery, or using appropriate peripheral crown wheels, not shown, according to operational and construction arrangements that are known to the skilled person.

Each of the filter disks 10 has a main plane of extension, which is placed substantially parallel to the flow direction F, to provide the so-called dynamic tangential filtration. In this kind of filtration, the flow of liquid to be filtered is not orthogonal, but inclined to the plane of extension of the filter mesh associated with the disk. Such inclination is not obtained geometrically but dynamically, as a result of the relative velocity of the disk rotating about its axis, hence by imparting components parallel and perpendicular to the plane of the filter mesh to the velocity vector of the particles. Therefore, the resultant of the velocity is inclined to each individual mesh aperture, which will prevent the passage of particles even smaller than the maximum size of the filter mesh aperture. In other words, under dynamic tangential filtration conditions, the flow passage section of the mesh is reduced with respect to the real size of the mesh under static conditions.

Also, the film consisting of a layer of suspended solids and acting as a precoat is formed earlier, which will increase filtration efficiency.

As far as construction is concerned, the disks 10 have mutually facing inner surfaces 10' and outer surfaces 10" facing opposite from the center plane M of the machine toward the influent chamber 7, and peripheral edges 15 having lip seals 16 or the like, in sliding contact with the bottom wall 9.

The inner surfaces 10' of the disks and the seals 16 delimit the treatment chamber 8 in a substantially watertight manner. Since the flow of the liquid to be filtered is fed from inside the disks, the solid particles will be retained on the inner surfaces 10" of the filter disks.

At least one effluent chamber 17 for receiving the filtered liquid is located downstream from the filter disks 10, with respect to the flow direction F. In the illustrated embodiment, the effluent chamber 17 initially comprises two lateral portions 17', 17" that are symmetrical with respect to the center plane M, each being delimited by the outer surface 10" of a respective disk 10, which join together downstream, thereby forming a single chamber 17.

The effluent chamber 17 has a discharge conduit 18 formed in the longitudinal end wall 2" of the caisson 2, which is designed to convey the filtered water forward the recycled water distribution system or another point of use or possibly an afterbay reservoir.

In order to remove the particles retained by the disks and improve filtration effectiveness, first jet washing means are provided, which are directed against the outer surfaces 10" of the disks, generally designated by numeral 20.

Particularly, the first jet washing means 20 comprise at least one first pair of pipes 21 placed at the sides of the disks 10 and connected to a manifold 22 that is fed with a pressurized washing fluid. Nozzles 23 are evenly distributed along the pipes 21 and face the outer surface 10" of the disks to eject washing jets and remove the solid particles retained on the inner surfaces 10' of the meshes.

The first washing means 20 have first conveyance means associated therewith for conveying the solid particles removed by the jets, comprising at least one first collecting duct 24 for collecting the removed solid particles, interposed between the disks 10, which has substantially parallel longitudinal edges 25, located at a predetermined minimum distance D from the inner surfaces 10' of the disks. Such first collecting duct 24 is substantially horizontal or slightly inclined to the horizontal to convey the solid particles, mixed with the filtered liquid, toward a collecting manifold connected to a discharge pipe for discharging the solid particles, not shown.

The washing fluid may be selected from water, air or a mixture thereof, possibly added with a chemical detergent.

Possibly, second washing means of vertical type may be provided, generally referenced 26, which comprise a second pair of pipes 27, having a substantially vertical orientation, placed on opposite sides of the disks 10 and fed by respective feed lines 28 with a pressurized washing liquid. The second pipes 27 have respective series of nozzles 29 evenly arranged along their longitudinal extent and oriented toward the outer surface of the filter disks 10.

The second jet washing means 26 have second collecting means, which may comprise a second collecting duct 30 located in the gap between the pair of disks 10 in a substantially vertical position, parallel to the second pair of pipes 27, but with collecting ends common to the first duct 24, such that the collected solid particles may be conveyed toward the same external sewer.

Conveniently, the second collecting duct 30 may comprise a pair of substantially identical and facing elongate half-shell elements 30', 30", with vertical edges spaced to define a pair of lateral slits 31 therebetween for the passage of the washing jets generated by the nozzles 29.

A peculiar characteristic of the invention is that the inner surfaces 10" of the disks 10 are substantially continuous and flat, with a flatness error $\epsilon$ smaller than said minimum distance D. Thus, since the planarity error is maintained at very low values, the minimum distance D may be reduced, and the amount of solid particles removed by the washing means 20 that fall into the treatment chamber is accordingly reduced.

In order to increase the planarity of the disks 10 and reduce the deformation of the filtering surface during operation, each filter disk 10 comprises a bearing structure 32 consisting of a substantially circular peripheral edge 33 joined to the central hub 11 via radial elements or spokes 34, thereby defining a series of wedge-shaped compartments.

Figure 13:
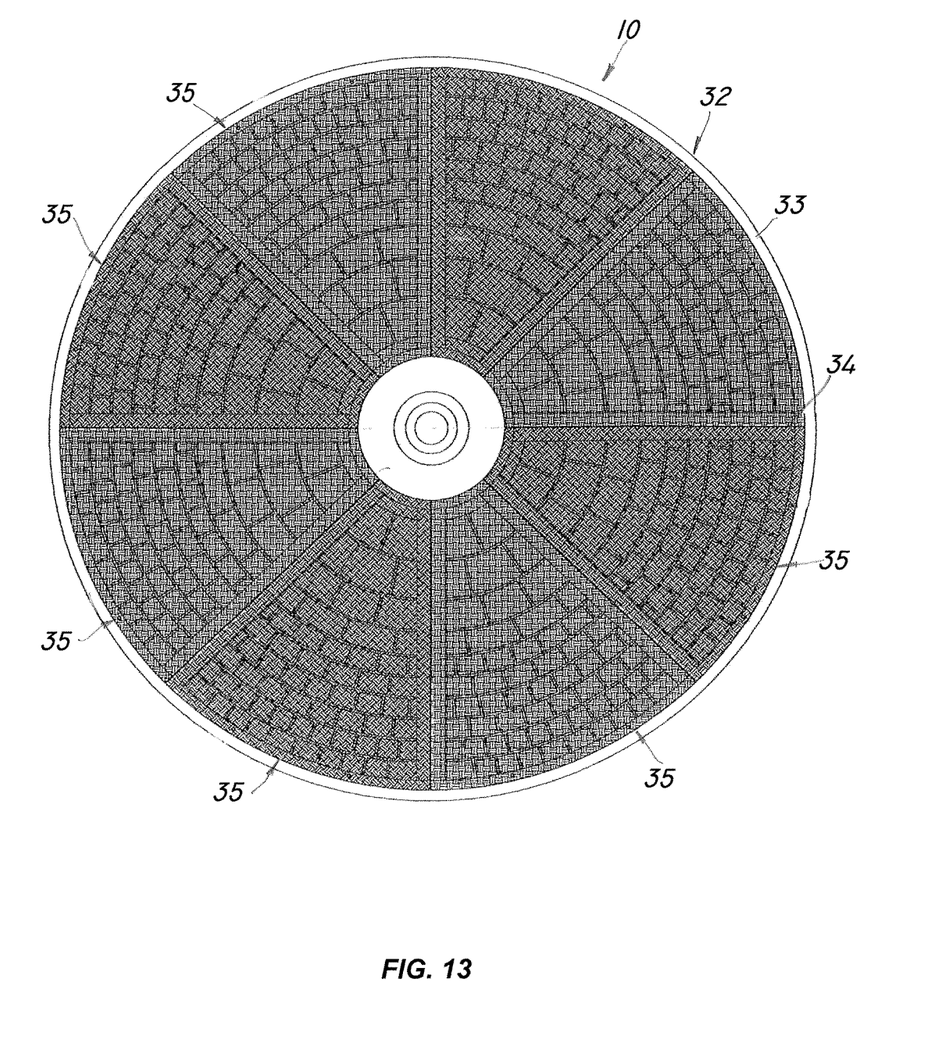
FIG. 13 is a front view of a disk of the machine of FIG. 4.
Figure 14:
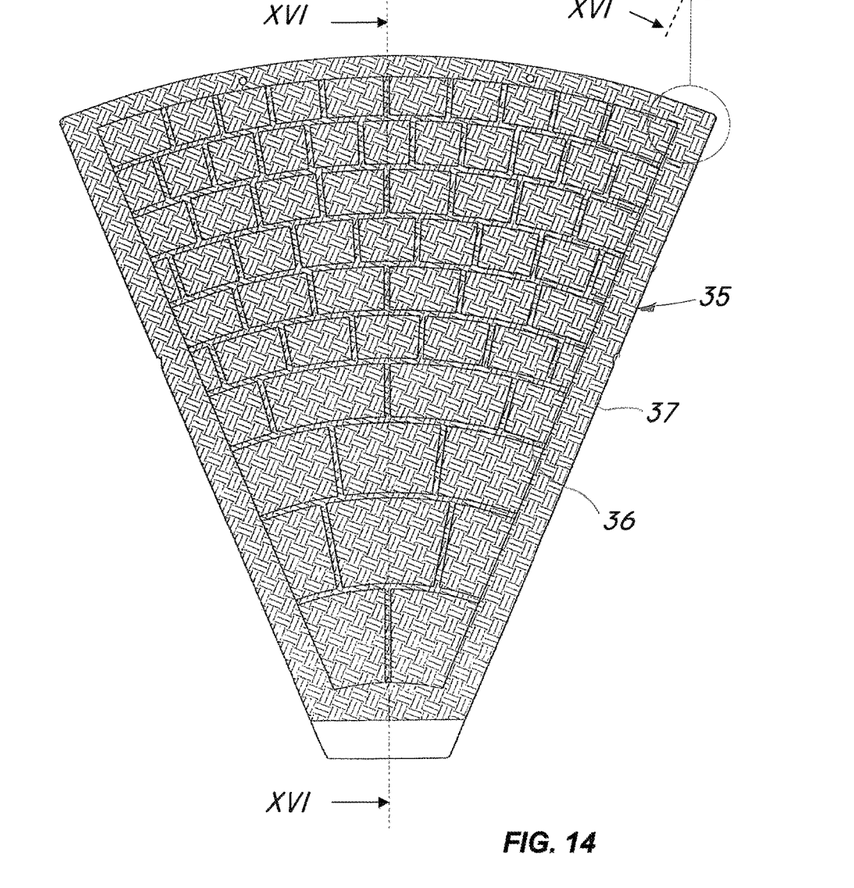
FIG. 14 is a front view of a disk of the machine of FIG. 13.
Figure 15:
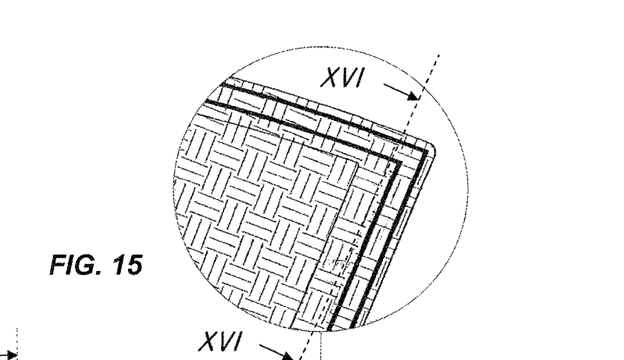
FIG. 15 is an enlarged view of a detail of the view of FIG. 14.
Figure 16:
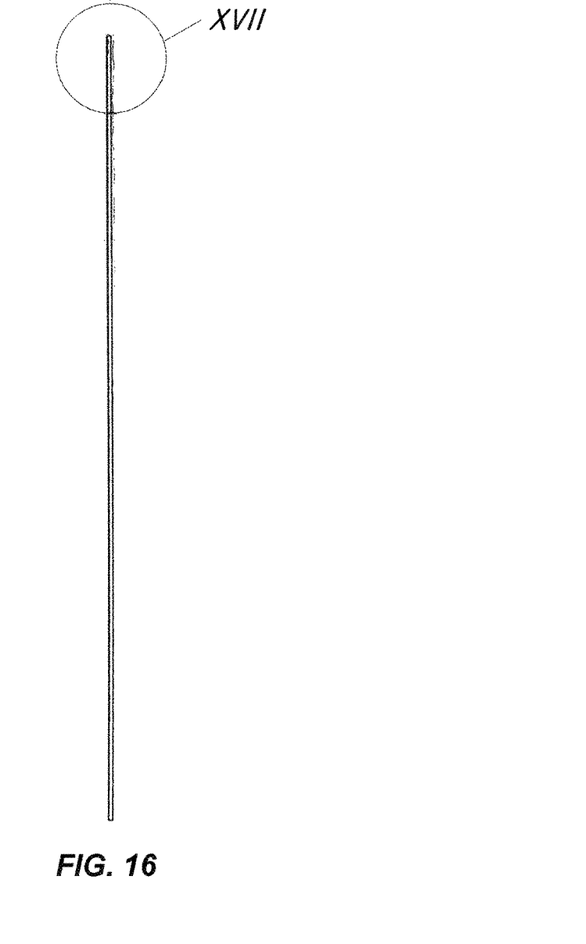
FIG. 16 is a sectional view of the part of FIG. 14, as taken along a plane XVI-XVI.
Figure 17:
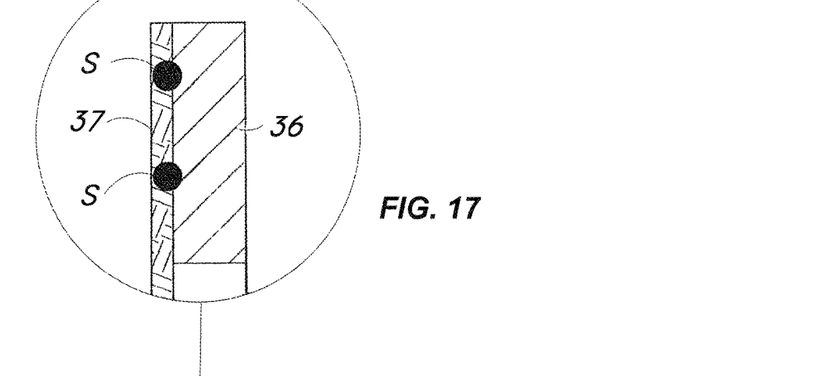
FIG. 17 is an enlarged view of a detail of FIG. 16.

Each wedge-shaped compartment is designed to support a substantially sector-shaped filter element 35, as better shown in FIGS. 13 and 14.

Each filter element 35 comprises a grid-like mount 36, with a sector-shaped peripheral frame, having a corresponding portion of filter mesh 37 attached thereto, which is appropriately pre-tensioned to a predetermined minimum tension, i.e. at least 20 N/cm.

The filter mesh may consist of a three-dimensional single- or double-layer plain or braided knit fabric, with a porosity ranging, for example from 8 to 15 µm or even less.

By mere way of example, the filter meshes may be made of single- or double-layer stainless steel, but may be also made of a synthetic material.

The filter elements 35 so obtained are very light and easy to handle, and further have a high planarity, thereby fulfilling the main technical problem.

Preferably, the mounts 37 have appropriate removable universal connection members, not shown, for easy replacement and/or maintenance. For example, these connection members may consist of flat- or conical-head anchor screws, adapted to fit into holes formed in the grid frames 37 and to be tightened into matingly threaded formed in the bearing structure 32.

The use of stainless steel filter meshes, that are highly resistant and sturdy, will impart considerable stiffness and deformation resistance to the entire structure, which will be a critical feature to minimize the distance D of the surface 10" of the disk both from the edges 25 of the first duct 24, and from those of the second duct 30.

Preferably, the planarity error $\epsilon$ will be reduced below 1% of the maximum external diameter of the disk 10.

In order to prevent washing liquid diffusion when the lid 3 is removed for inspection and operational check of the machine, an appropriate backsplash device 38, also known as toroidal guard, which has an approximately semicircular shape, and is placed above the disks 10.

Particularly, the backsplash device 38 may comprise a substantially cylindrical central sheet wall 39 whose width is greater than the maximum dimension of the disks, with two curved lateral profiles 39 approximately having a U-shaped cross section, being anchored about at their ends, each surrounding the upper portion of a disk 10.

The presence of this device will allow collection of washing liquid splashes, especially emitted by the nozzles of the washing pipes which direct a large amount of liquid toward the outer walls of the disks.

Figure 1:
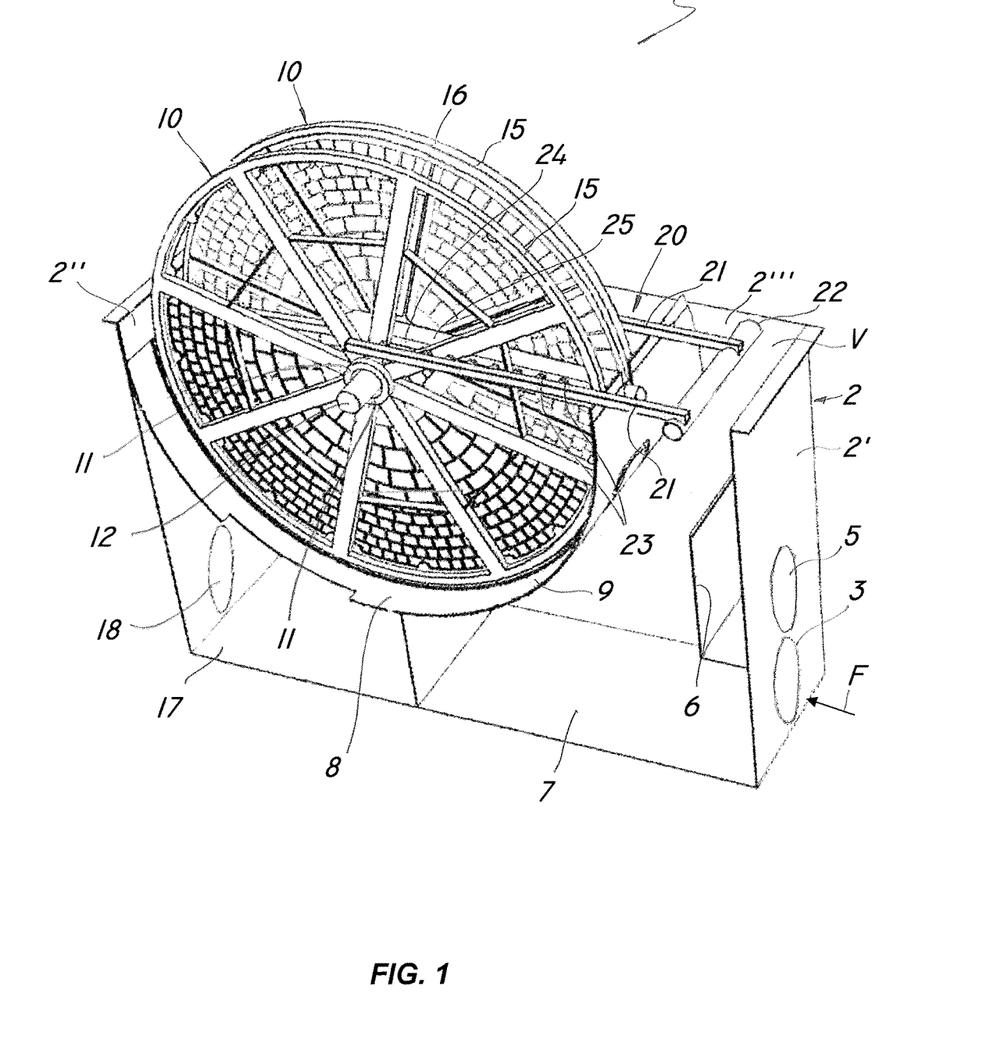
FIG. 1 is a general perspective view of the machine of the invention under rest conditions, without its lid and with certain parts being omitted for a clearer vision of the machine.
Figures 2, 3:
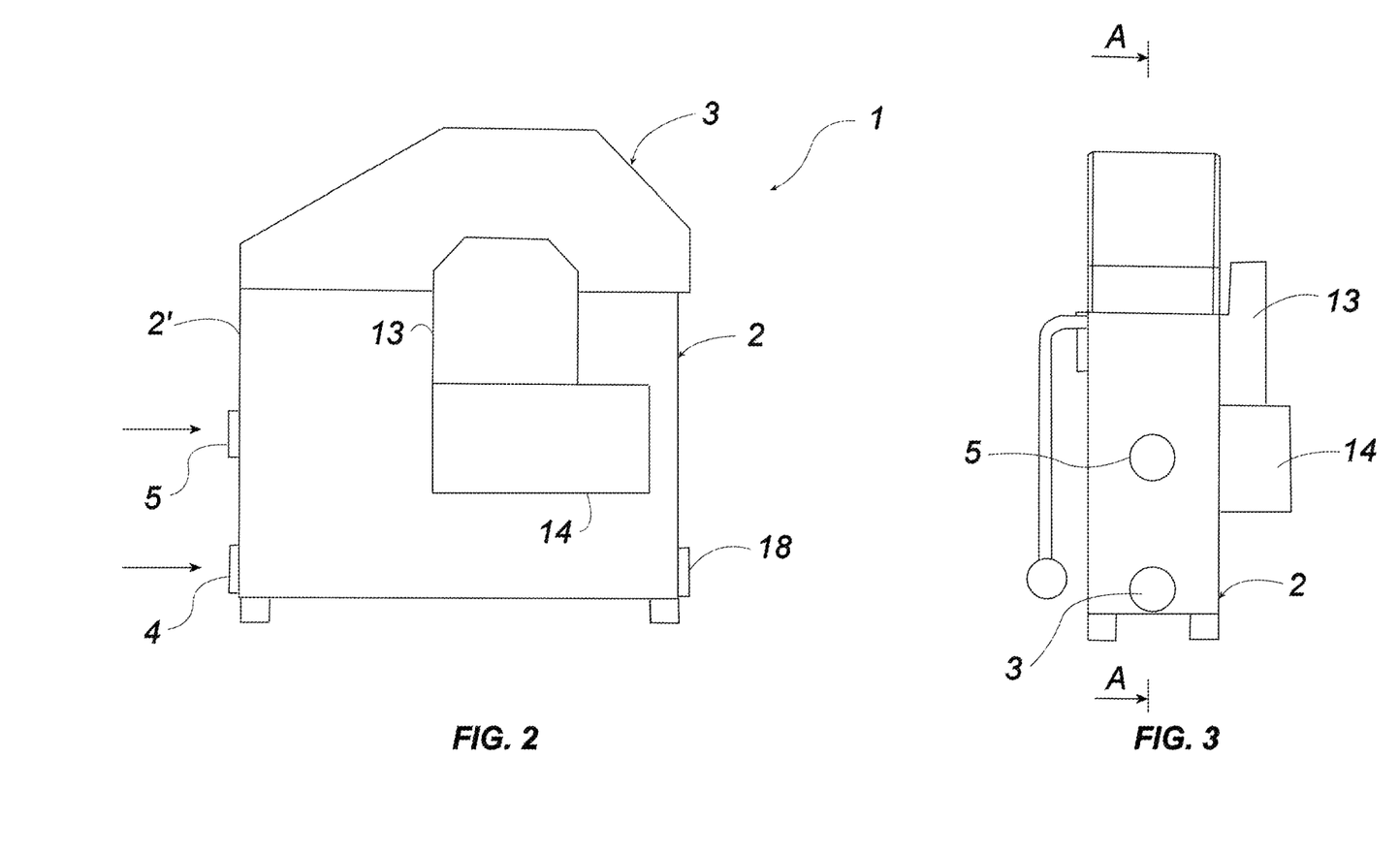
FIG. 2 is a general lateral view of the machine of FIG. 1, with its lid.
FIG. 3 is a general front view of the machine of FIG. 3, as taken along arrow III.
Figure 4:
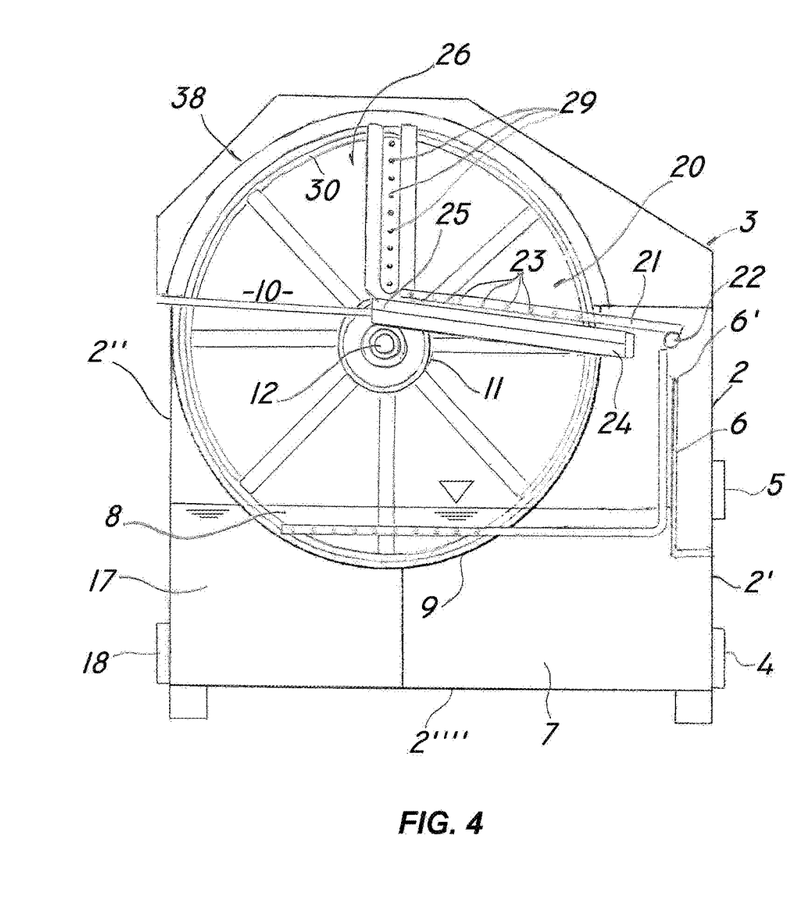
FIG. 4 is a partially broken away longitudinal view of a first embodiment of the machine of FIG. 2, as taken along the plane IV-IV of FIG. 3.
Figure 5:
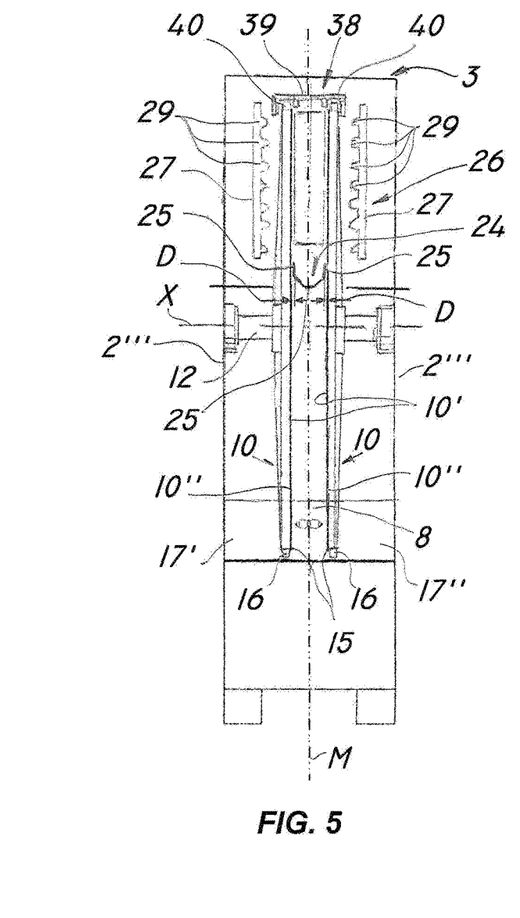
FIG. 5 is a partially broken-away view of the machine of FIG. 4, as taken along the plane V-V.
Figure 6:
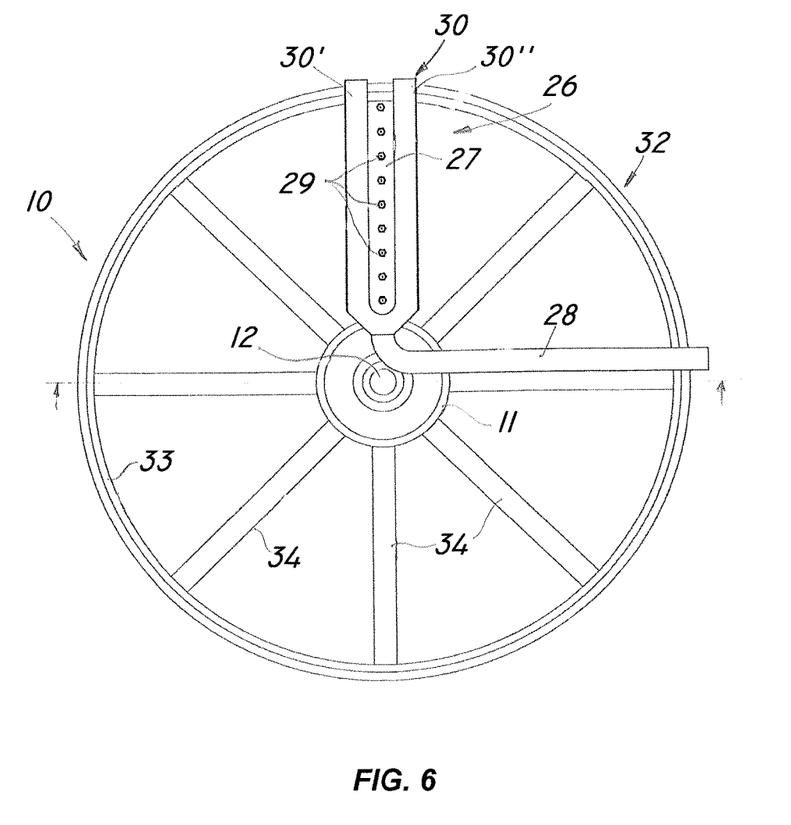
FIG. 6 is a lateral view of a component of a part of the partially broken-away view of FIG. 4.
Figure 7:
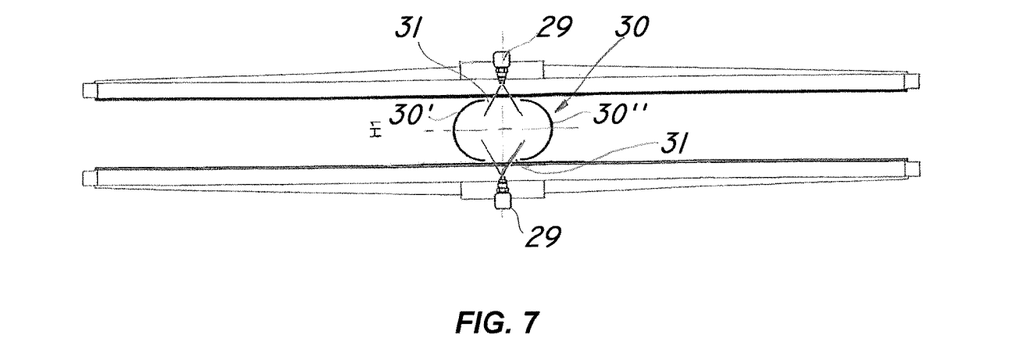
FIG. 7 is a top view of the part of FIG. 6.
Figure 8:
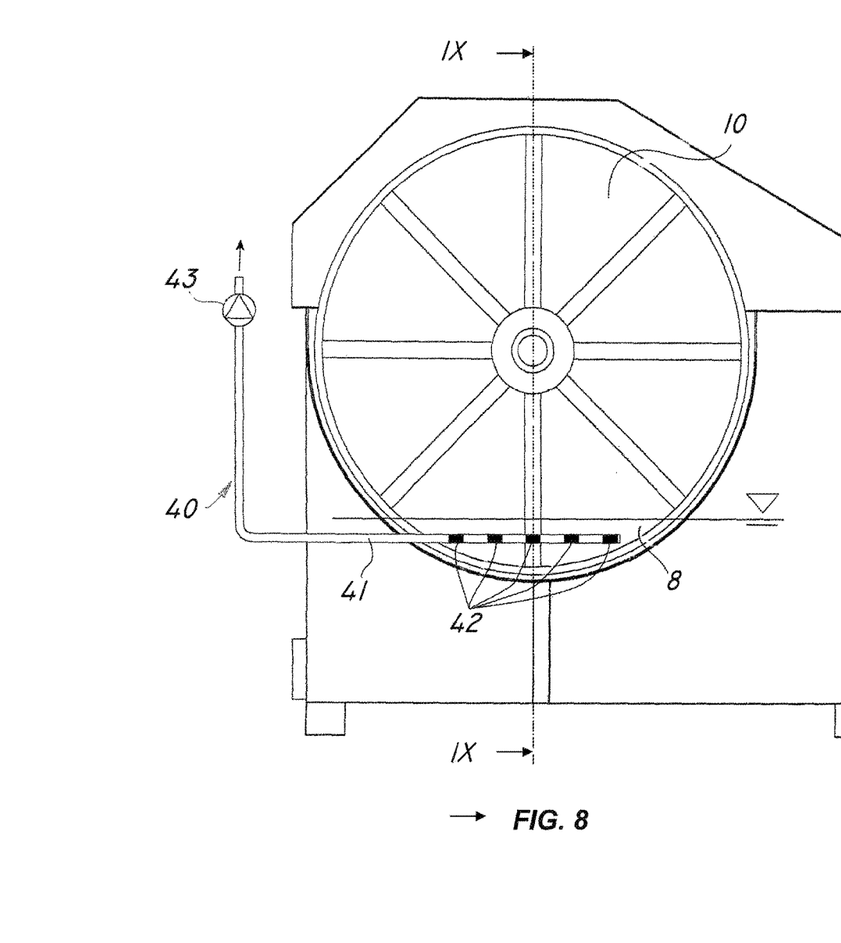
FIG. 8 is a partially broken away longitudinal view of a variant of the machine of FIG. 4.
Figure 9:
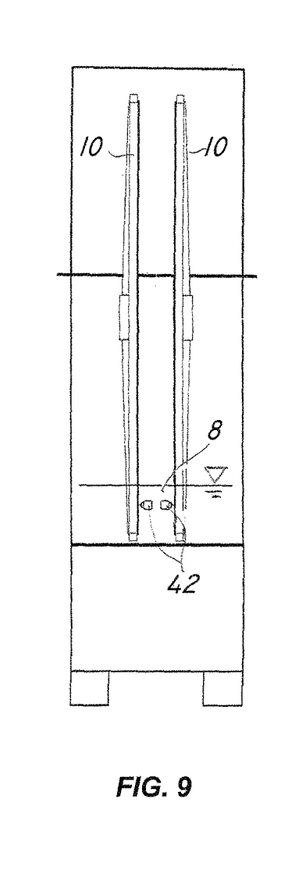
FIG. 9 is a sectional view of the variant of FIG. 8.

In order to reduce the deposition of solid particles in the submerged portion of the disks, a local suction device 40, best shown in FIG. 8, is placed in the treatment chamber 8, and comprises a pipe 41 substantially submerged in this chamber 8 and having a plurality of ejectors 42 facing the inner wall 10' of the disks 10, for sucking in the solid particles that have been caught by the respective filter meshes.

In case of extended operation, solid particles deposit on the bottom of the treatment chamber 8, and later become sand or sludge, which may hinder normal watertight sliding of the peripheral seals 16 of the disks 10, and hence cause damaging thereof. Thus, a drain hole 18 is appropriately formed on the bottom wall 9 of the treatment chamber 8, with a discharge pipe 44 and a valve 45 controlled for periodic sludge discharge.

Dynamic tangential filtration by the filter disks was found to result from the inclination of the velocity vector of the flow, with respect to the filter mesh apertures. Also, a higher rotation speed of the filter disks was found to result in a greater inclination and hence an improved dynamic tangential filtration effect.

In prior art filtering machines, disk rotation was such that the tangential velocity of the disks in the portion submerged in the treatment chamber 8 was concurrent with the velocity of the flow F in such area. Therefore, the relative velocity of the particles with respect to the filter mesh was reduced by the tangential velocity of the disks, and this involved a reduced inclination to the mesh apertures. In the filtering machine of the present invention, the drive means 13, 14 may be controlled to impart a counter-rotation to the disks 10, whereby the tangential velocity of the disks in the submerged portion is opposite to the flow velocity, and hence increases the component parallel to the surface of the filter mesh, by increasing the inclination of the velocity vector, and consequently reducing the size of the particles allowed to pass through the mesh apertures.

In the prior art, the operation involved breaking of the confined flow and caused a level difference between the liquid in the treatment chamber 8 and the liquid in the effluent chamber 17. It was found that, as the level $H_1$ of the liquid to be filtered increases in the effluent chamber 17, the level $H_2$ in the treatment chamber 8 increases to reach the axis of the disks. Here, the disks are said to operate in "submerged" conditions.

Figure 10:
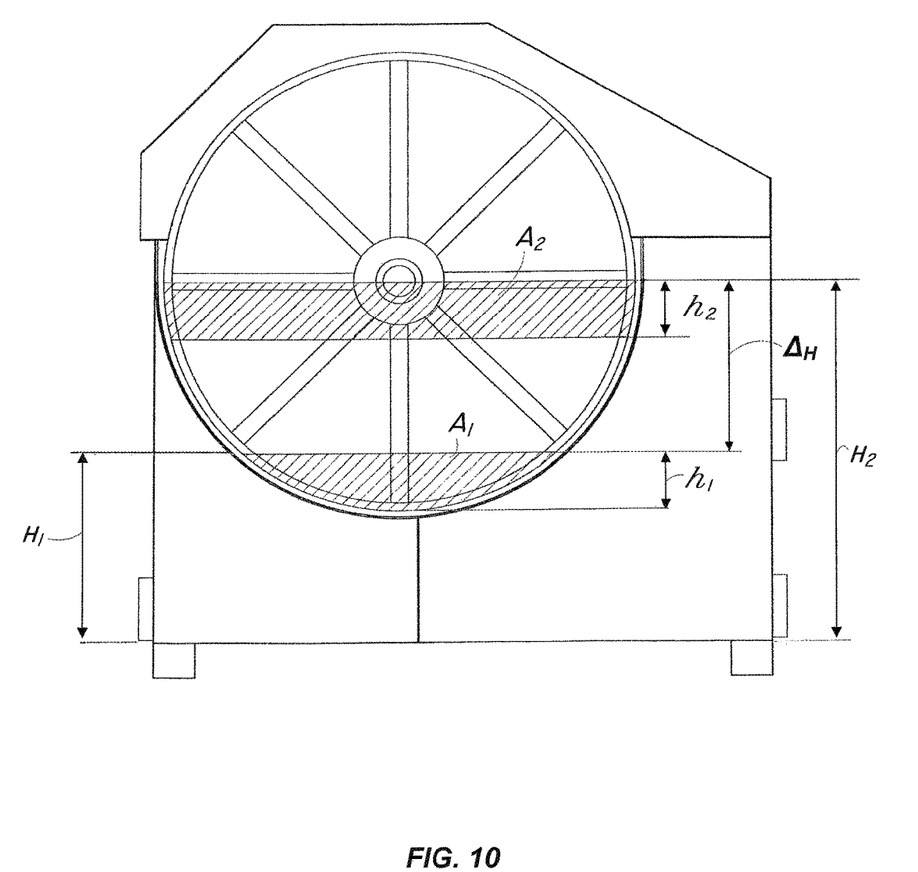
FIG. 10 is an axial front view of a part of the disk of FIG. 9.
Figure 11:
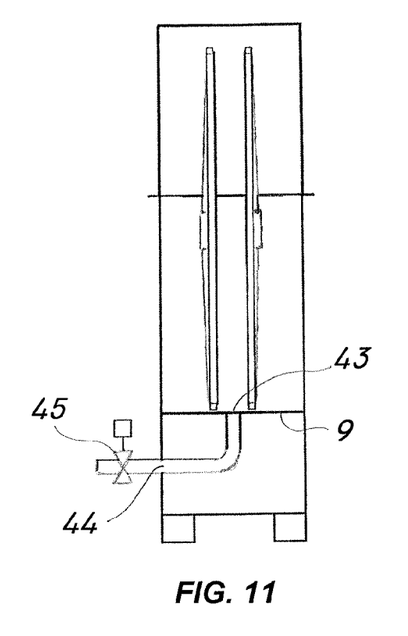
FIG. 11 is a partially broken away longitudinal view of a further variant of the machine of FIG. 4.

Assuming that the level difference ΔH exists between the liquid to be filtered in the treatment chamber 8 and the filtered liquid in the effluent chamber 17, if the disks 10 are submerged further by a level $h_2$ equal to the level $h_2$, as schematically shown in FIG. 10, the area $A_2$ of the liquid that contacts the filter mesh in the treatment chamber 8 is found to be geometrically larger than the area $A_1$ of the filtering surface that was subtracted from liquid passage when the head was increased in the effluent chamber 17. This results in a larger filtering surface, and hence in higher efficiency and flow rate of the treated liquid.

Figure 12:
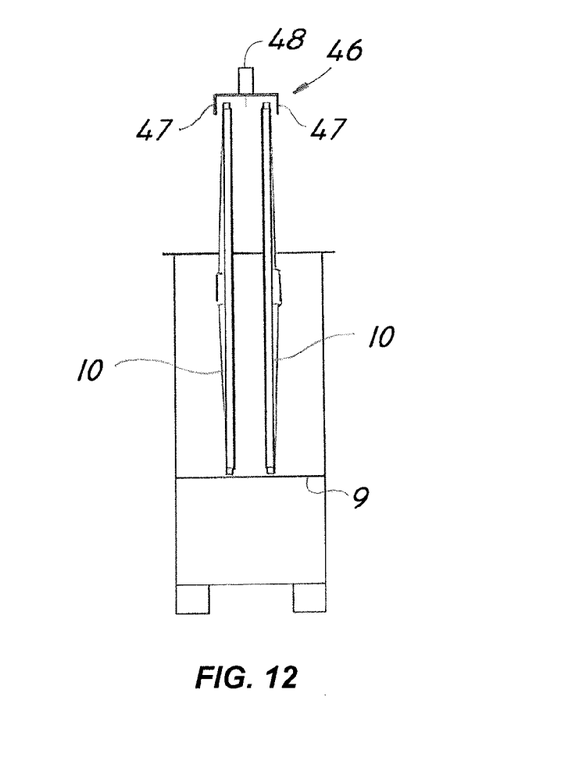
FIG. 12 is a partially broken away transverse view of a further variant of the machine of FIG. 4.

In order to further increase the flow rate of the machine, an overpressure may be established in the treatment chamber 8, which will operate as a fluid piston on the liquid to be filtered. For this purpose, as schematically shown in FIG. 12, an annular cover 46 is provided in the upper portion of the disks 10, with lateral sealing edges 47 acting upon the disks 10, and a pressurized air delivery pipe 48 connected to an outer compressor, not shown. The disks 10 operate as walls of a closed compartment and the pressurized air acts upon the liquid head in the chamber 8 to increase the load that acts upon the filtering surfaces of the disks.

A further system for increasing the fluid flow rate in the machine consists in a device for injecting a high-pressure fluid into the treatment chamber 8 in the submerged area between the filter disks 10, not shown. The high-pressure fluid may be water or air or a mixture thereof, and will have the effect of increasing turbulence in the treatment chamber. Such increased turbulence will increase the Reynolds number, and will result in a lower resistance to the outflow of liquid from the treatment chamber 8 to the effluent chamber 17.

The above disclosure clearly shows that the machine for continuous microfiltration of suspended solid particles from wastewater fulfills the intended objects and particularly affords improved performances and lower manufacturing and maintenance costs.

The machine for continuous filtration of the invention is susceptible of a number of changes and variants, within the inventive concept disclosed in the appended claims. All the details thereof may be replaced by other technically equivalent parts, and the materials may vary depending on different needs, without departure from the scope of the invention.

While the machine has been described with particular reference to the accompanying figures, the numerals referred to in the disclosure and claims are only used for the sake of a better intelligibility of the invention and shall not be intended to limit the claimed scope in any manner.

The invention claimed is:

1. A machine for continuous microfiltration of suspended solid particles from process and/or waste water, comprising a base container (2) with an inlet conduit (4) for a liquid to be filtered, defining a flow direction (F), said container (2) having therein:
   an influent chamber (7) for collecting the liquid to be filtered;
   a treatment chamber (8) placed downstream from said influent chamber (7), and having an at least partially cylindrical bottom wall (9);
   at least one pair of filter disks (10), which are keyed to a shaft (12) substantially perpendicular to said flow direction (F), said disks (10) having inner filtering surfaces (10') delimiting said treatment chamber (8) and outer peripheral edges (15) in sliding contact with said bottom wall (9);
   at least one effluent chamber (17) for receiving the filtered liquid, located downstream from said treatment chamber (8) and delimited by said pair of filter disks, said effluent chamber (17) having a discharge conduit (18) formed in said container (2);
   a drive system (13, 14) acting upon said shaft (12) and/or on said disks (10) and causing rotation thereof in a predetermined direction;
   jet washers (20) directed against outer surfaces (10") of said disks (10) for removing the particles retained thereby; and
   a conveying system that conveys the solid particles removed by said jet washers, comprising at least one first collecting duct (24) disposed between said disks (10) above said treatment chamber (8) and having substantially parallel side edges, located at a predetermined minimum distance (D) from said inner surfaces (10') of said disks (10) for collecting the removed solid particles,
   wherein each filter disk comprises a bearing structure (32) having a substantially circular peripheral edge (33) joined to a central hub (11) through radial elements (34)

to define a series of wedge-shaped compartments, each wedge-shaped compartment supporting a substantially sector-shaped filter element (35), wherein each filter element (35) comprises a grid-shaped mount (36) with a peripheral frame corresponding to the peripheral frame of each wedge-shaped compartment upon which a corresponding portion (37) of filter mesh is fixed, and wherein said bearing structure (32), said filter mesh (37), and said mounts (36) are made of a rigid material selected from the group consisting of synthetic materials or stainless steel, said filter elements (37) being anchored with a predetermined minimum tension of at least 20 N/cm to respective mounts (36) with side edges of said mounts (36) being in mutual contact so that inner surfaces (10') have a flatness tolerance that is less than 1% of a maximum diameter of said disks (10).

2. A machine as claimed in claim 1, wherein said outer peripheral edge (15) of said bearing structure (32) has peripheral seals (16) which slide on said bottom wall (9) of the base container (2).

3. A machine as claimed in claim 1, wherein said filter mesh (37) is a three-dimensional single- or double-layer plain or braided knit fabric, with a porosity of 15 µm or less.

4. A machine as claimed in claim 1, wherein each portion of the mesh (37) is anchored to a respective frame (36) by an adhesive or substantially continuous microwelds (S).

5. A machine as claimed in claim 1, wherein said jet washers (20) comprise at least one first pair of longitudinal pipes (21) placed at sides of said pair of disks (10) and fed with a pressurized washing fluid, and wherein each of said pair of pipes (21) has respective nozzles (23) evenly arranged along a longitudinal extent of said pipes.

6. A machine as claimed in claim 5, wherein said pair of pipes (21) is substantially horizontal or nclined and is connected to a conveying manifold (22) connected to a discharge pipe for discharging the solid particles, and wherein said first pair of pipes (21) is substantially parallel and raised with respect to side edges (25) of said first duct (24).

7. A machine as claimed in claim 5, wherein said jet washers (26) comprise a second pair of pipes (27), which is fed with a pressurized washing liquid, the second pair of pipes having respective series of second nozzles (29) evenly arranged along a longitudinal extent of the second pair of pipes.

8. A machine as claimed in claim 7, wherein said conveying system comprises at least one second collecting duct (30) associated with said second pair of pipes (27) and interposed between said pair of disks (10) in a substantially vertical position, above said shaft (12) to extend a particle collection area.

9. A machine as claimed in claim 8, wherein said second collecting duct (30) comprises a pair of facing elongate half-shells (30', 30"), spaced with respect to a vertical plane of symmetry, to define a pair of substantially vertical lateral slits (31) therebetween for passage of washing jets.

10. A machine as claimed in claim 9, wherein a substantially circular backsplash device (8) is placed above said pair of disks (10), said backsplash device (38) essentially consisting of a substantially semicircular central wall (39) with two semicircular profiles (40) having a U-shaped cross section attached thereto, and designed to partially surround the outer peripheral edges (15) of said disks (10).

11. A machine as claimed in claim 1, wherein a suction pipe (40) is provided for sucking in solid particles, which comprises a plurality of ejectors (42) facing the inner filtering surfaces (10') of said filter disks (10) for sucking in the solid particles caught by the respective filter meshes.

12. A machine as claimed in claim 1, wherein said bottom wall (9) has a drain hole (43) with a discharge pipe (44) for discharging sludge formed by deposits of solid particles accumulated on said bottom, a valve (45) being placed along said pipe, which controls sludge discharge, to prevent damage to said filter disks.

13. A machine as claimed in claim 1, wherein the filter disks (10) have, in operation, a submerged portion in the treatment chamber (8), further comprising a drive system (13, 14) that provides a rotation to the disks with a tangential velocity opposite to a feed velocity of a fluid to be treated.

14. A machine as claimed in claim 1, wherein a liquid control system (H1) is provided in said effluent chamber (17), which maintains a head of the filtered liquid in the effluent chamber (17) at a level equal to or higher than a level of said bottom wall (9).

15. A machine as claimed in claim 1, wherein at least one pressurized air pipe (48) is provided, which communicates with a space between said pair of filter disks above said treatment chamber (8) between said pair of filter disks (10) to increase filtration load.

16. A machine as claimed in claim 1, wherein a device for injecting a pressurized fluid is provided in a gap between said pair of disks (10) in proximity of said bottom wall (9) for increasing turbulence of the liquid to be treated, and hence Reynolds' number and a flow of fluid that passes through said pair of filter disks (10).

17. A machine as claimed in claim 16, wherein a pump, a compressor, or a pressurized reservoir are provided for maintaining said fluid under pressure.

* * * * *